(12) United States Patent
Smith et al.

(10) Patent No.: US 9,163,463 B2
(45) Date of Patent: Oct. 20, 2015

(54) BEND LIMITING STIFFENER AND RELATED METHODS

(75) Inventors: Ron Smith, Channelview, TX (US); Jeff Hunt, Channelview, TX (US)

(73) Assignee: Deep Down, Inc., Channelview, TX (US)

( * ) Notice: Subject to any disclaimer, the term of this patent is extended or adjusted under 35 U.S.C. 154(b) by 0 days.

(21) Appl. No.: 13/485,277

(22) Filed: May 31, 2012

(65) Prior Publication Data

US 2012/0304447 A1 Dec. 6, 2012

Related U.S. Application Data

(60) Provisional application No. 61/492,162, filed on Jun. 1, 2011.

(51) Int. Cl.
| | |
|---|---|
| *E21B 17/01* | (2006.01) |
| *F16L 1/12* | (2006.01) |
| *F16L 57/02* | (2006.01) |
| *F16L 35/00* | (2006.01) |

(52) U.S. Cl.
CPC ............... *E21B 17/017* (2013.01); *F16L 1/123* (2013.01); *F16L 35/00* (2013.01); *F16L 57/02* (2013.01); *Y10T 29/4984* (2015.01)

(58) Field of Classification Search
USPC ................. 405/168.1, 168.2, 168.3; 441/133; 4/505; 138/155, 120
See application file for complete search history.

(56) References Cited

U.S. PATENT DOCUMENTS

| | | | | |
|---|---|---|---|---|
| 4,396,797 | A * | 8/1983 | Sakuragi et al. | 174/68.3 |
| 4,647,255 | A * | 3/1987 | Pow | 405/168.1 |
| 6,220,303 | B1 * | 4/2001 | Secher et al. | 138/110 |
| 6,331,129 | B1 * | 12/2001 | Earley | 441/133 |
| 2007/0059954 | A1 * | 3/2007 | Suggs | 439/101 |
| 2007/0248434 | A1 * | 10/2007 | Wiley et al. | 411/160 |
| 2008/0044233 | A1 * | 2/2008 | O'Sullivan | 405/158 |
| 2010/0052316 | A1 * | 3/2010 | Smith | 285/223 |
| 2012/0241037 | A1 * | 9/2012 | Lund | 138/106 |

* cited by examiner

*Primary Examiner* — Frederick L Lagman
*Assistant Examiner* — Kyle Armstrong
(74) *Attorney, Agent, or Firm* — Osha Liang LLP

(57) ABSTRACT

A bend restrictor device includes at least two bend limiter units coupled together and having at least one stiffness ring disposed therebetween.

20 Claims, 5 Drawing Sheets

BEND LIMITING STIFFENER AND RELATED METHODS

CROSS-REFERENCE TO RELATED APPLICATIONS

This application claims priority under 35 U.S.C. §119(e) to U.S. Provisional Application Ser. No. 61/492,162 filed on Jun. 1, 2011, which is hereby incorporated by reference in its entirety.

BACKGROUND

1. Field of the Disclosure

Embodiments disclosed herein relate generally to bend restrictor devices for flexible pipes and umbilicals. In particular, embodiments disclosed herein relate to a bend limiting stiffener installed on umbilicals and flexible pipes.

2. Background Art

Flexible pipes, flowlines, power cables, and umbilicals are usually connected to a rigid structure such as a subsea riser base, pipeline end manifold (PLEM), wellhead or other structure. To prevent these pipes from overbending at the interface between flexible and rigid structures, bending restrictors may be installed on the pipe. Bending restrictors, or bend limiters, are devices used where static (or quasi static) loads act on a pipe, while bend stiffeners are separate devices that act to resist dynamic loads. The bending restrictor usually includes a number of interlocking elements which articulate when subjected to an external load and lock together to form a smooth curved radius known as the locking radius. The locking radius may be chosen to be equal to or greater than the minimum bend radius of the pipe. Once the elements have locked together the bending moment present is transferred into the elements and back through an interface between the flexible and rigid structure, thereby protecting the pipe from potentially damaging loads.

The installation of bend stiffeners and limiters may be very costly, as current technology allows for the units to be installed only during the umbilical manufacturing process. Because of this, the larger umbilicals now require limiters of immense inner diameter to fit over the terminal end of the umbilical. Because of this, there are large gaps between the outer diameter of the umbilical and the inner diameter of the limiters (i.e., an annulus space).

Accordingly, there exists a need for a device capable of providing bend limiting and stiffening characteristics along with rapid installation.

SUMMARY OF THE DISCLOSURE

In one aspect, embodiments disclosed herein relate to a bend restrictor device including at least two bend limiter units coupled together and having at least one stiffness ring disposed therebetween.

In other aspects, embodiments disclosed herein relate to a method of inhibiting bending of a flexible pipe, the method including installing at least two bend limiter units coupled end to end together onto at least a portion of the flexible pipe and disposing at least one stiffness ring between the at least two coupled bend limiter units.

Other aspects and advantages of the invention will be apparent from the following description and the appended claims.

DETAILED DESCRIPTION

Figure 1:
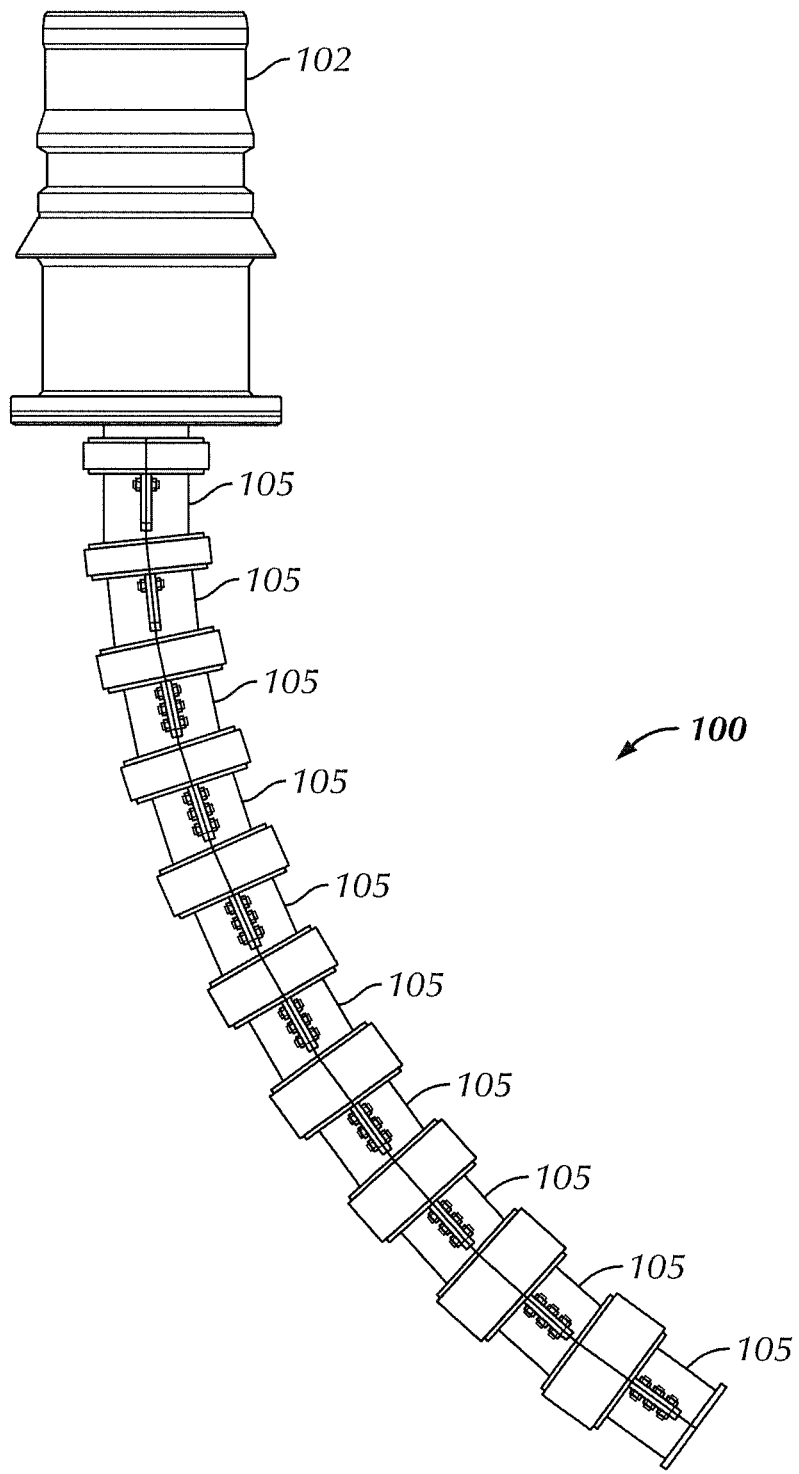
FIG. 1 shows a perspective view of a bend limiting stiffener in accordance with one or more embodiments of the present disclosure.

In one aspect, embodiments disclosed herein relate to a bend limiter with multiple stiffeners incorporated therein, or a bend limiting stiffener. The bend limiting stiffener may be used on umbilicals and other flexible pipes to resist bending while also limiting the amount of bend radius of the umbilical or flexible pipe. Referring to FIG. 1, a perspective view of a bend limiting stiffener 100 in accordance with one or more embodiments of the present disclosure is shown. The bend limiting stiffener 100 includes a series of individual bend limiter units 105 coupled together and installed onto an umbilical or flexible pipe (not shown). The umbilical or flexible pipe may extend from a termination point or connector 102, which may ultimately terminate in a rigid structure (not shown), such as a rig structure or equipment on the rig structure.

Figure 2A:
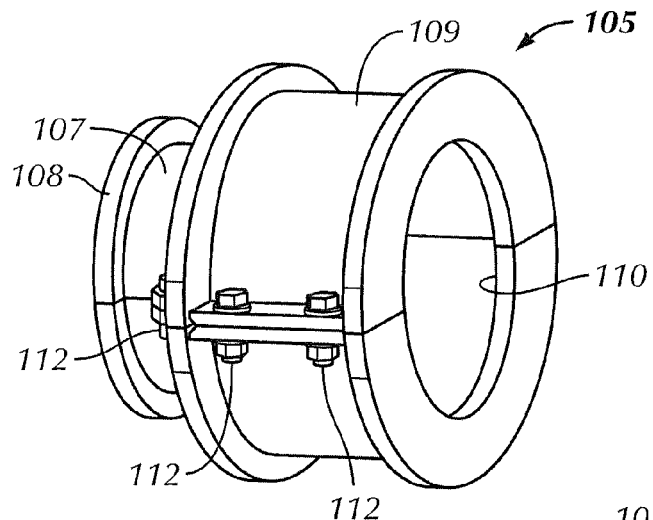
FIGS. 2A-2C show perspective views of split bend limiter units in accordance with one or more embodiments of the present disclosure.
Figure 2B:
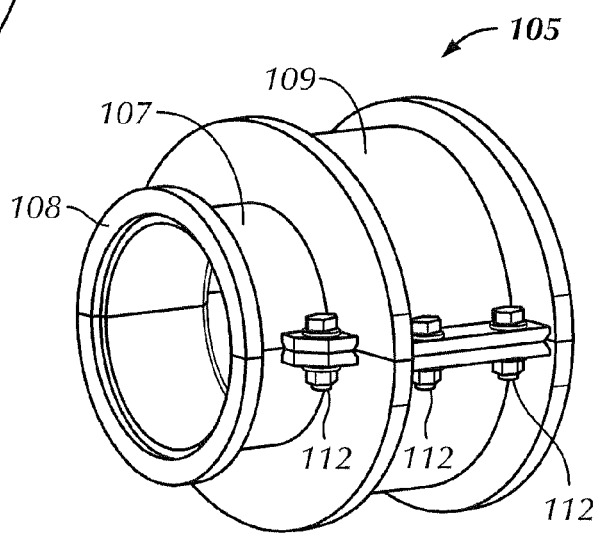

Referring now to FIGS. 2A and 2B, perspective views of an individual bend limiter unit 105 in accordance with one or more embodiments of the present disclosure are shown. The individual bend limiter units 105 are generally cylindrically shaped with a generally cylindrical central bore axially therethrough. The central bore inner diameter may be configured to be slightly larger than an outer diameter of a flexible pipe or umbilical onto which the bend limiter units may be installed. Other outer profile configurations may be square, polygonal, or other desired outer profiles. The bend limiter unit 105 has a male end 107, which includes a male ring 108 or flange structure. On the opposite end of the bend limiter unit 105 from the male end 107 is a female end 109 having an inner shoulder 110 formed therein. Multiple bend limiter units 105 may be coupled together by inserting the male end 107 of a first bend limiter unit within the female end 109 of a second bend limiter unit. With the male end 107 inserted within the female end 109, the male ring 108 of the male end 107 is configured to abut against the inner shoulder 110 of the female end 109 and prevent the male end 107 from coming apart from the female end 109 (i.e., the outer diameter of the male ring 108 is larger than an inner diameter of the inner shoulder 110). Coupling multiple bend limiter units together forms a series of coupled bend limiter units that makes up the bend limiting stiffener.

Figure 2C:
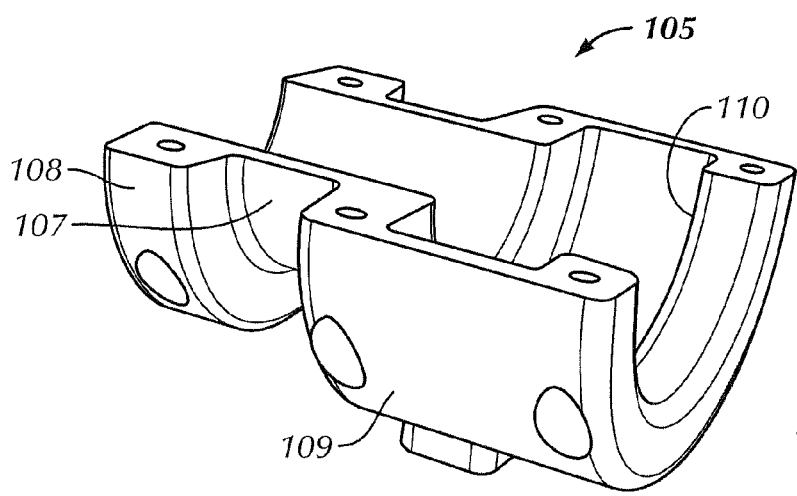

Referring further to FIG. 2C, as shown, the bend limiter units 105 are configured as split units. In certain embodiments, the bend limiter units 105 may be split into two identical halves (as shown), however those skilled in the art will understand alternative types of split configurations that be used, including, but not limited to, unequally split and/or more than two split components. The split halves of the bend limiter units 105 may be fastened together using mechanical fasteners 112 (e.g., bolts, screws, rivets, etc.). In other embodiments, the split halves of the bend limiter units 105 may be fastened by other types of fasteners including welds, adhesives, and other fasteners known to those skilled in the art. In still further embodiments, the splits halves may be hinged on one edge (i.e., in a clamshell configuration) while fasteners are used to secure the other edge after installation.

The split halves of the bend limiter units 105 may be molded or integrally formed as split units. The bend limiter units 105 may be made of various types of hard plastics or other rigid structure materials. In other embodiments, the bend limiter units 105 may be steel or other metallic materials.

Figure 3:
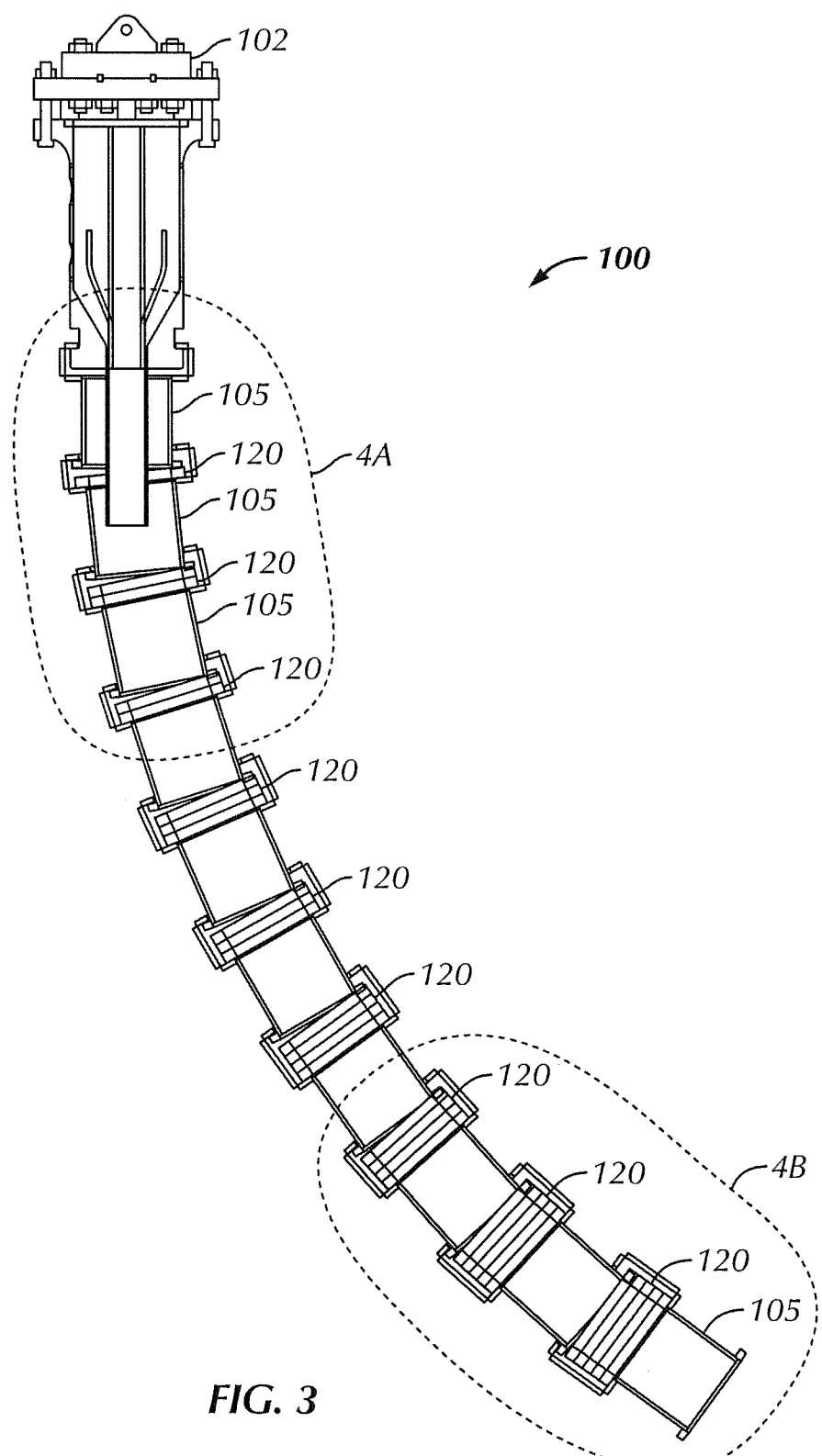
FIG. 3 shows a cross-section view of the bend limiting stiffener of FIG. 1 in accordance with one or more embodiments of the present disclosure.

Referring now to FIG. 3, a cross-section view of a bend limiting stiffener 100 in accordance with one or more embodiments of the present disclosure is shown. The bend limiting stiffener 100 includes two or more coupled bend limiter units 105 and at least one stiffness ring 120. Stiffness rings 120 may be flat and generally circular-shaped discs or wafers. Other stiffness ring shapes (e.g., polygonal, elliptical, etc.) may also be used. One or more stiffness rings 120 may be installed within a female end of a first unit (109 in FIGS. 2A and 2B) and proximate the male ring of a second unit (108 in FIGS. 2A and 2B), i.e., the "coupled connection," of the bend limiter units 105 to provide stiffness (i.e., resistance to bending) along a length of the bend limiting stiffener 100. The stiffness rings 120 may be any type of resilient thermoplastic material, including, but not limited to, nylon, polyurethane, polyethylene, and other types of thermoplastic materials known to those skilled in the art. Further, the stiffness rings 120 may be split to be used with the split halves configuration of the bend limiter units 105. In certain embodiments, the stiffness rings 120 may be between about one-quarter inch and five inches thick. In certain embodiments, the stiffness rings 120 may be about one inch thick. The multiple stiffness rings used in the bend limiting stiffener 100 may have uniform thicknesses in certain embodiments. In alternate embodiments, the stiffness rings may vary in thickness along a cross-section thereof. In other embodiments, multiple stiffness rings may have thicknesses different from one another in the same coupled connection (i.e., each stiffness ring may have a different thickness from the next stiffness ring).

The bend limiting stiffener 100 disclosed herein serves as an integrated bend stiffener and bend limiter. As external forces are applied to the bend limiting stiffener 100, the bend limiting stiffener 100 initially acts as a bend stiffener. As external forces act on the bend limiting stiffener 100 and cause it to bend, the stiffness rings 120 provide resistance (i.e., stiffness) to counteract the external forces and bending. The amount of stiffness provided by the stiffness rings 120 may depend on a number of factors as discussed above, including but not limited to the number of stiffness rings 120 provided within a coupled connection, the stiffness ring thickness, the cumulative axial thickness of the stiffness ring(s); and the stiffness ring material. Additional stiffness rings 120 disposed within a coupled connection provides greater bending resistance and stiffness in the coupled connection.

Figure 4A:
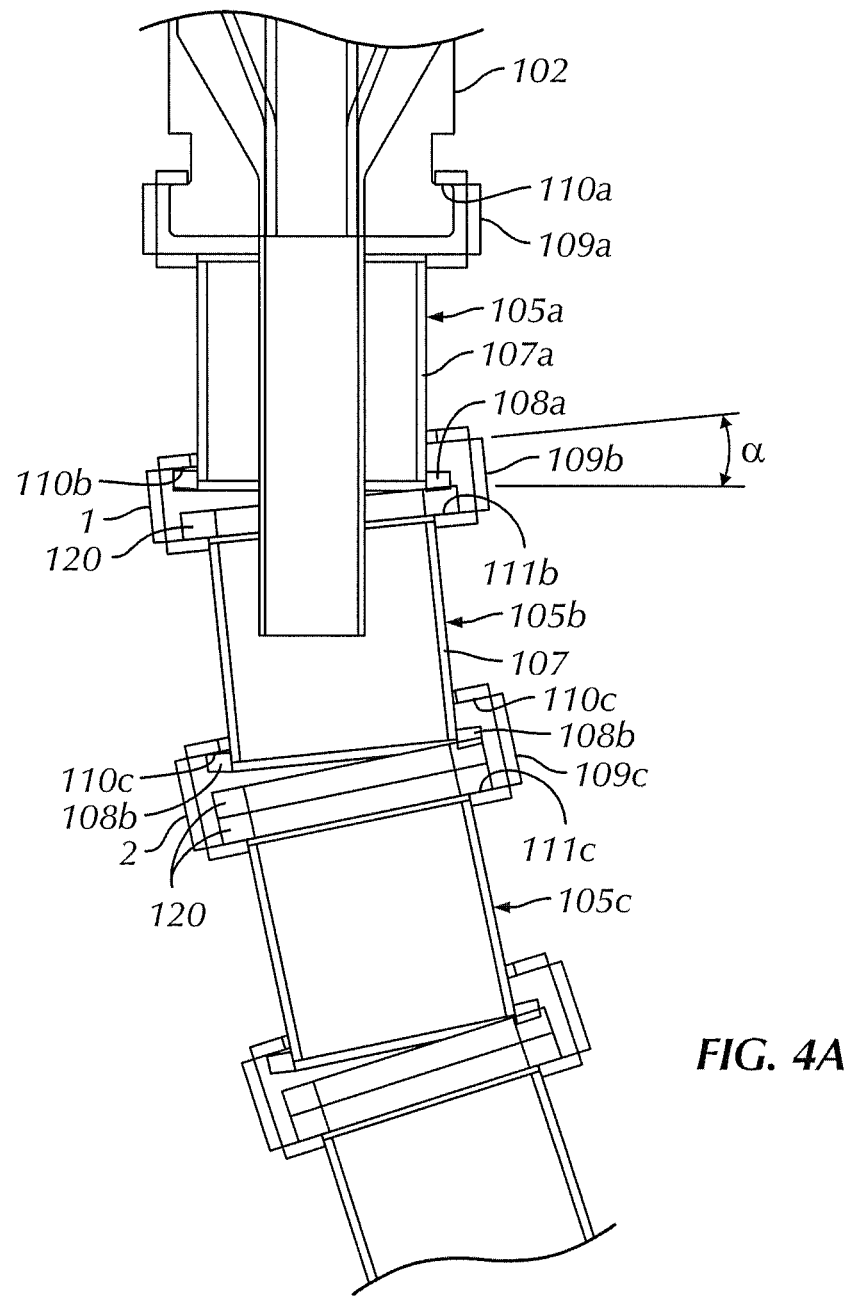
FIGS. 4A and 4B show enlarged cross-section views of the bend limiting stiffener of FIG. 3 in accordance with one or more embodiments of the present disclosure.
Figure 4B:
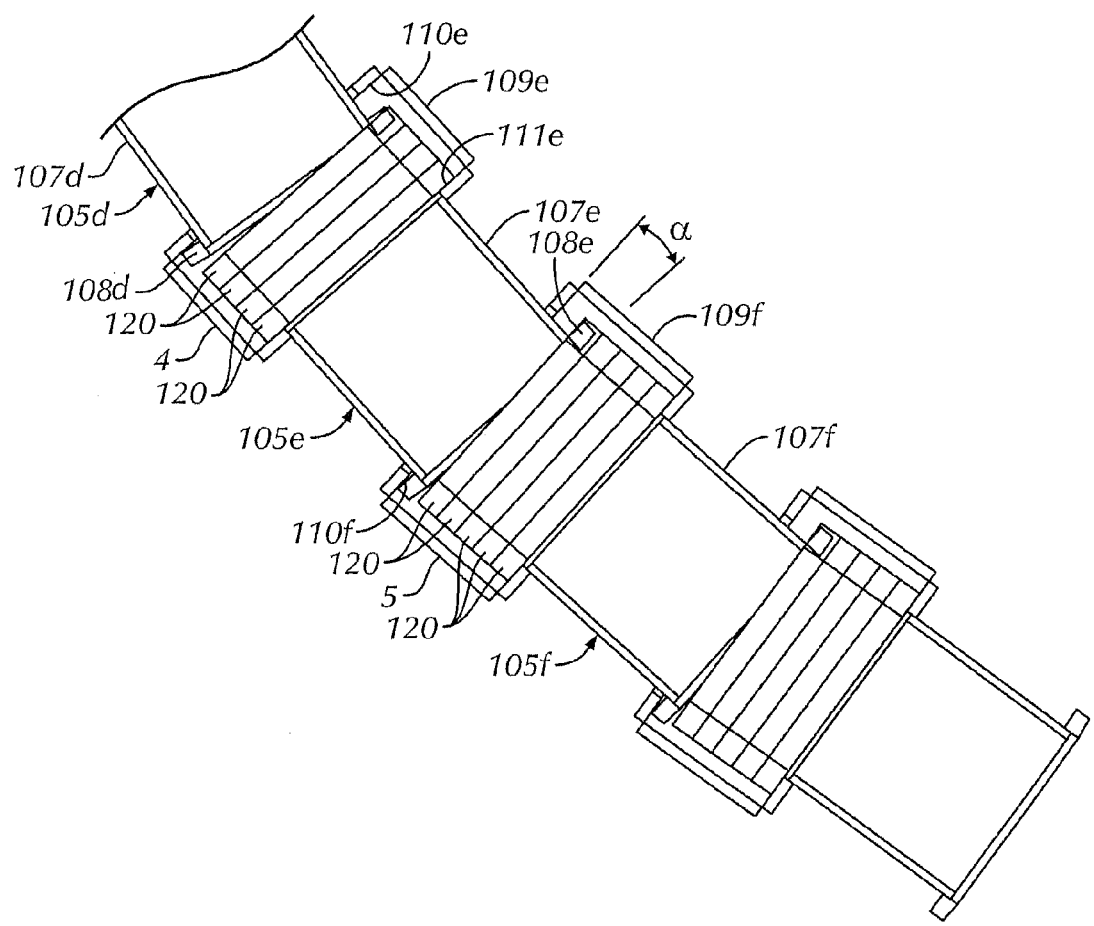

As mentioned, one method of varying stiffness along a length of the bend limiting stiffener 100 is to increase the number of stiffness rings in the coupled connections along its length. FIGS. 4A and 4B show enlarged cross-section views of the bend limiting stiffener 100 shown in FIG. 3 in accordance with one or more embodiments of the present disclosure. FIG. 4A shows a number of coupled connections of the bend limiter units 105 near the termination point 102. In the first coupled connection "1," a single stiffness ring 120 may be disposed within a female end 109b of a second unit 105b and proximate the male ring 108a of the male end 107a of a first unit 105a coupled with the second unit 105b. In the second coupled connection "2," two stiffness rings 120 may be disposed within a female end 109c of a third unit 105c and proximate the male ring 108b of the male end 107b of the second unit 105b.

Referring briefly to FIG. 4B which shows the distal end of the bend limiting stiffener 100, in the coupled connection indicated as "4," four stiffness rings 120 may be disposed within a female end 109e of a second unit 105e and proximate the male ring 108d of a male end 107d of a first unit 105d coupled with the second unit 105e. Still further, five or more stiffness rings 120 may be disposed in the female end 109f of a third unit 105f and proximate and male ring 108e of the second unit 105e in the coupled connection indicated as "5." In coupled connections having two or more stiffness rings, the split in each of the multiple stiffness rings may be arranged such that none of the splits are circumferentially aligned with splits of the adjacent stiffness rings. In alternate embodiments, the stiffness ring splits may be circumferentially aligned. In still further embodiments, rather than having multiple stiffness rings stacked within a coupled connection, a single stiffness ring having increased thickness may be disposed in each succeeding coupled connection along a length of the bend limiting stiffener 100.

Due to the arrangement of stiffness rings along the length of the bend limiting stiffener (i.e., an increasing number of stiffness rings are arranged along a length from the proximal end at the termination point to the distal end), when external forces are initially applied to the bend limiting stiffener 100, the "bend" will begin at the coupled connection having the fewest stiffness rings, i.e., the coupled connection with the least stiffness. As the external forces are increased on the bend limiting stiffener, the bend travels toward the stiffer portions of the bend limiting stiffener (i.e., the portions with more stiffness rings 120) up until the bend is at the last coupled connection with the greatest number of stiffness rings 120, at which point the bend limiter may engage, as will be described subsequently. Stated otherwise, the stiffness rings 120 are arranged along a length of the bend limiting stiffener 100 such that the external load is transmitted along a length of the bend limiting stiffener 100, from the least stiff coupled connection to the stiffest coupled connection. Finally, while FIGS. 4A and 4B illustrate a particular arrangement of stiffness rings 120 in the coupled connections, one skilled in the art will appreciate that any number or arrangement of stiffness rings 120 per coupled connection may be provided to yield particular stiffness characteristics of the bend limiting stiffener 100.

As the multiple coupled connections between the adjacent bend limiter units 105 allow the bend limiting stiffener 100 to bend, an angle "$\alpha$" shown in FIGS. 4A and 4B, which indicates a bend angle between two coupled bend limiter units 105 of the bend limiting stiffener 100, may be formed. As the entire bend limiting stiffener 100 bends, central axes of coupled bend limiter units 105 may be offset at a particular bend angle such that the male ring 108 of a first unit may contact and compress or deform the one or more stiffness rings 120 in the coupled connection. As the stiffness ring 120 is compressed, it acts to resist the external load causing the bending. As the stiffness ring 120 is compressed further, it further resists the bending. Thus, when the stiffness ring 120 is partially compressed, forces may be transmitted between the coupled bend limiter units 105 through the stiffness rings 120. The stiffness rings 120 are configured to compress up to about 50% of the material yield strength in certain embodiments. In other embodiments, the stiffness rings 120 may be configured to compress up to about 75% material yield strength.

When the stiffness ring 120 is completely or fully compressed (i.e., up to an available material yield strength limit) by the male ring 108, the rigid male ring 108 and back wall 111 of the female end 107 may engage, which is the maximum bend angle $\alpha$ allowed. Stated otherwise, at the maximum bend angle $\alpha$, the stiffness ring 120 may be fully compressed, such that the male ring 108 contacts the back wall 111 of the female end 107 and may travel no further. Thus, in effect, the bend limiter feature is engaged, which restricts bending past a particular bend radius. In certain embodiments, the maximum bend angle α for each coupled connection may be up to about 20 degrees. In other embodiments, the maximum bend angle α for each coupled connection may be up to about 10 degrees. In still further embodiments, the maximum bend angle α for each coupled connection may be up to about 5 degrees.

In certain embodiments, methods of inhibiting bending of a flexible pipe include installing at least two bend limiter units coupled end to end together onto at least a portion of the flexible pipe and disposing at least one stiffness ring between the at least two coupled bend limiter units. The method may further include installing split halves of the coupled bend limiter units onto the flexible pipe and securing the halves together. Regarding the stiffness rings, the method may further include providing stiffness along a length of the flexible pipe with the at least one stiffness ring by way of compressing the one or more stiffness rings. Stiffness along a length of the bend restrictor device may be increased by providing an increasing number of stiffness rings along a length of the bend restrictor device. Further, the method may include restricting bending of the flexible pipe past a maximum bend radius.

More specifically, methods of assembling the bend limiting stiffener (or bend restrictor) onto a flexible pipe or umbilical, in accordance with one or more embodiments disclosed herein, include installing a series of bend limiter units individually onto the flexible pipe. A first bend limiter unit may be installed by coupling a female end of a first bend limiter unit to a male end of the termination point (102 in FIG. 4A). As previously described, the bend limiter units have a split configuration, and therefore may be installed onto the flexible pipe after the flexible pipe is already attached to a termination point. Next, one or more stiffness rings may be installed within a female end of a second bend limiter, and the female end of the second bend limiter may be coupled to the male end of the first bend limiter unit. In certain embodiments, the one or more stiffness rings may be unattached within the female end of the bend limiter unit and merely allowed to "float" within a volume of the female end. In other embodiments, the one or more stiffness rings may be attached or secured within the female end. Continuing with assembly, a female end of a third bend limiter, having one or more stiffness rings disposed therein, may be coupled to the male end of the second bend limiter unit. This method may continue with subsequent bend limiter units being coupled to the previous bend limiter unit until a series of bend limiter units is coupled along a length of the flexible pipe and constitutes a full length bend limiting stiffener. Those skilled in the art will appreciate that any number of bend limiter units may be coupled together in series and installed along a length of the flexible pipe.

Advantageously, embodiments of the present disclosure provide a bend limiting stiffener capable of quick and easy installation onto any type of flexible pipe or umbilical. Because of the split nature of the bend limiter units, the units are not required to be slid over a large bull nose at a termination point of the flexible pipe. Further, the bend limiting stiffener acts as both a bend stiffener and a bend limiter. The stiffener wafers provide resistance to bending along the length of the bend limiting stiffener, while the bend limiter units provide a bend limiting feature to restrict the maximum bend radius of a flexible pipe or umbilical. Because of the easy installation and simplicity of the design, the bend limiting stiffener is a cost and time saving device that will be appreciated by the industry.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A bend restrictor device comprising:
   at least two bend limiter units coupled together, wherein each bend limiter unit comprises a male end and a female end;
   at least one stiffness ring having a first cumulative axial thickness and disposed in a female end of a first bend limiter unit; and
   at least one stiffness ring having a second cumulative axial thickness and disposed in a female end of a second bend limiter unit, wherein the first and second cumulative axial thicknesses are different.

2. The bend restrictor device of claim 1, wherein each bend limiter unit is generally cylindrical having a central bore therethrough.

3. The bend restrictor device of claim 2, wherein the male end of a first bend limiter unit comprises a flange configured to engage an inner shoulder formed in the female end of the second bend limiter unit.

4. The bend restrictor device of claim 1, wherein at least one bend limiter unit comprises two split halves fastened together.

5. The bend restrictor device of claim 1, wherein the at least one stiffness ring disposed in a female end of the first bend limiter unit comprises a different axial thickness from the at least one stiffness rind disposed in a female end of a second bend limiter unit.

6. The bend restrictor device of claim 1, wherein the at least one stiffness ring disposed in a female end of the first bend limiter unit comprises a thickness of between about one-quarter inch and about five inches.

7. The bend restrictor device of claim 1, comprising at least three bend limiter units, wherein a number of stiffness rings disposed between adjacent pairs of the at least three bend limiter units is different.

8. The bend restrictor device of claim 7, wherein each of the stiffness rings have a same axial thickness.

9. The bend restrictor device of claim 1, wherein the at least one stiffness ring disposed in a female end of the first bend limiter unit comprises a resilient thermoplastic material.

10. The bend restrictor device of claim 1, wherein the at least one stiffness ring disposed in a female end of the first bend limiter unit is configured to compress up to about 50% yield strength.

11. The bend restrictor device of claim 1, wherein a maximum bend angle between the at least two coupled bend limiter units is about 20 degrees.

12. The bend restrictor device of claim 1, wherein a maximum bend angle between the at least two coupled bend limiter units is about 5 degrees.

13. The bend restrictor device of claim 1, wherein the at least two bend limiter units are configured to be installed onto a flexible pipe.

14. The bend restrictor device of claim 1, wherein the at least one stiffness ring disposed in a female end of the first bend limiter unit comprises two split halves, wherein each half is semi-circular in shape.

15. The bend restrictor device of claim 1, wherein at least one bend limiter unit comprises two split portions fastened together, wherein the split portions are unequal.

16. The bend restrictor device of claim 1, wherein the at least one stiffness ring disposed in a female end of the first bend limiter unit comprises two split portions fastened together, wherein the split portions are unequal.

17. The bend restrictor device of claim 1, wherein the at least one stiffness ring disposed in a female end of the first bend limiter unit comprises more than two split portions.

18. An apparatus comprising:
a flexible pipe used for subsea drilling operations;
at least three bend limiter units disposed on the flexible pipe, each bend limiter unit comprising:
a male end having a flange disposed on a distal end thereof; and
a female end having an inner shoulder disposed on a distal end thereof;
wherein the at least three bend limiter units are coupled together by inserting a male end of a first bend limiter unit into a female end of a second bend limiter unit; and
at least one stillness ring disposed between a flange of the first bend limiter unit and an inner shoulder of the second bend limiter unit, wherein a number of stiffness rings disposed between a first adjacent pair and a second adjacent air of the at least three bend limiter units is different.

19. The bend restrictor device of claim 18, wherein the at least one stiffness ring is disposed within the female end of the second bend limiter unit.

20. A bend restrictor device comprising:
at least three bend limiter units coupled together, wherein each bend limiter unit comprises a male end and a female end; and
at least one stiffness ring disposed in a female end of at least one of the bend limiter units,
wherein a number of stiffness rings disposed between adjacent pairs of the at least three bend limiter wilts increases from a proximal end to a distal end.

\* \* \* \* \*